United States Patent [19]
Shoh

[11] 3,863,826
[45] Feb. 4, 1975

[54] SONIC OR ULTRASONIC APPARATUS

[75] Inventor: Andrew Shoh, Ridgefield, Conn.

[73] Assignee: Branson Instruments, Incorporated, Stamford, Conn.

[22] Filed: Apr. 23, 1973

[21] Appl. No.: 353,227

[52] U.S. Cl. ............... 228/1, 29/470.1, 156/73, 156/580
[51] Int. Cl. .................... B23k 1/06, B23k 5/20
[58] Field of Search ............ 228/1; 29/470.3, 420.1; 156/73, 580; 310/26

[56] References Cited
UNITED STATES PATENTS

| | | | |
|---|---|---|---|
| 3,384,284 | 5/1968 | Okeda | 228/1 X |
| 3,492,847 | 2/1970 | Ustyantsev et al. | 228/1 X |
| 3,493,457 | 2/1970 | Jugler | 228/1 X |
| 3,586,122 | 6/1971 | Jaeke | 228/1 |

*Primary Examiner*—Francis S. Husar
*Assistant Examiner*—Robert J. Craig
*Attorney, Agent, or Firm*—Ervin B. Steinberg

[57] ABSTRACT

A sonic or ultrasonic apparatus comprises electroacoustic transducer means for providing vibratory energy applied to a workpiece to cause welding for instance. The transducer means is coupled by a set of leaf spring members to a stationary support. Reciprocating motion of the transducer means toward and away from the workpiece is accomplished by bending the leaf spring members using a motive means, such as a pneumatically driven piston. The leaf spring members yield in the direction of this reciprocating motion which substantially coincides with the axis of propagation of the vibratory energy, but exhibit rigidity along the direction normal to such axis.

23 Claims, 9 Drawing Figures

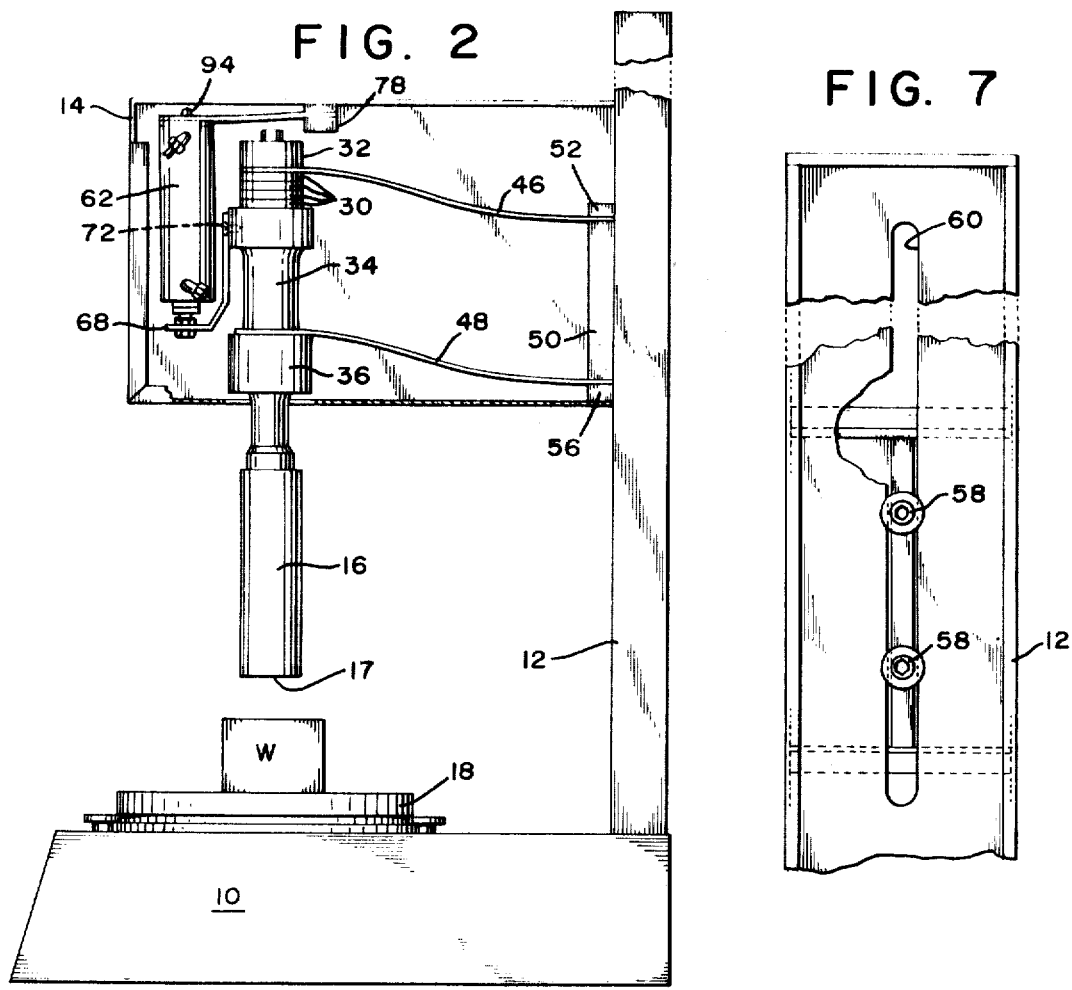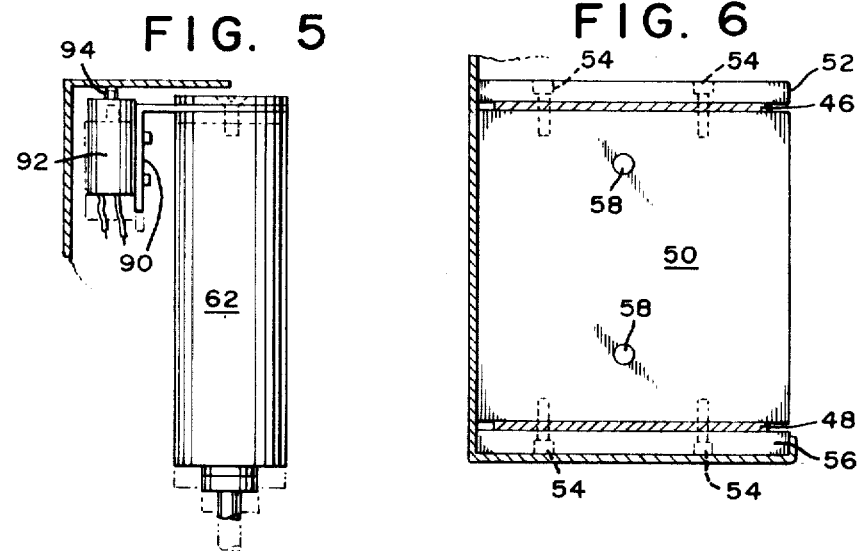

SONIC OR ULTRASONIC APPARATUS

BACKGROUND OF THE INVENTION

This invention relates to sonic or ultrasonic apparatus and more specifically has reference to apparatus of this type used for welding thermoplastic parts and otherwise imparting vibratory energy in the sonic or ultrasonic frequency range to a workpiece.

The use of energy in the sonic or ultrasonic frequency range for welding thermoplastic workpieces or performing similar work such as riveting, staking, insertion of parts and the like is well established in industry. Parts sonically or ultrasonically joined range from toys and photographic articles to automobile taillight assemblies and television cabinets. The parts to be welded are assembled along superposed surfaces and while a static compressive force is applied for holding the parts in intimate contact, sonic or ultrasonic energy is imparted briefly to one of the parts to cause melting of thermoplastic material along the interface between the parts, such molten material providing upon solidification a weld between the parts, see "Ultrasonic Bonding" by W. R. Tyrrell, Modern Plastics Encyclopedia, McGraw-Hill, Inc., New York, N.Y. (1971). Apparatus for performing such welding are well established, a typical embodiment being disclosed in U.S. Pat. No. 3,222,239 to H. Deans, entitled "Ultrasonic Sealing System," dated Dec. 7, 1965.

Generally, an apparatus of this construction includes a platform and a column vertically extending therefrom. The column includes means for supporting an electroacoustic transducer means which upon electrical energization converts the electrical energy applied to vibratory energy. Motive means are provided between the column and the transducer means to cause reciprocating motion of the transducer means and its horn coupled thereto toward the platform for imparting vibratory energy to a workpiece disposed thereon and subsequently for lifting the transducer and horn assembly away from the platform to permit the removal of the welded workpiece and placement of a new workpiece upon the platform. The combination of platform, column, transducer mounting means and motive are termed in the trade frequently a stand or press.

The prior art stands known include relatively expensive linear slides, linear ball bushings, or pantographic arrangements in combination with helical springs for controlling and guiding the reciprocating motion of the transducer means. These mechanisms, of course, involve the use of sliding parts, linkages and other elements which must be made to a high degree of precision, must be hardened, frequently precision ground and accurately aligned to withstand millions of cycles of high-stress use as is encountered when sonic or ultrasonic welding apparatus of this type are installed on high speed production lines.

SUMMARY OF THE INVENTION

The apparatus disclosed hereafter eliminates the conventional linear reciprocating means and instead uses yieldable leaf spring members which couple the transducer means to the column. The leaf springs are designed and dimensioned to yield in one direction for providing gross reciprocating motion of the transducer means toward and away from the platform, but to exhibit rigidity in the other direction which is the direction normal to the required reciprocating motion. The welding process for thermoplastic workpieces requires that during welding a static force be applied to the workpiece, the direction of such force being parallel to the direction of propagation of the vibratory energy. The leaf spring members comply with this requirement and do not impede the transfer of vibratory energy to the workpiece since the direction of propagation of the vibratory energy substantially coincides with the direction of gross motion of the transducer means toward and away from the platform. The reciprocating motion is achieved merely by bending the leaf spring members in a controlled manner.

The construction disclosed hereafter is characterized by extreme simplicity, the absence of complicated mechanical arrangements and provides most importantly an apparatus which is endowed with a high degree of reliability, ease of maintenance, and extraordinary simplicity.

Other salient features of the present invention will be more clearly apparent by referring to the following description and drawing.

BRIEF DESCRIPTION OF THE DRAWING

FIG. 2 is a side elevational view, partly in section, of the apparatus, showing the transducer means and horn in its raised position;

FIG. 5 is a view along line 5—5 in FIG. 4;

FIG. 6 is a sectional view along line 6—6 in FIG. 3;

FIG. 7 is an elevational view along line 7—7 in FIG. 3;

DETAILED DESCRIPTION OF THE PREFERRED EMBODIMENT OF THE INVENTION

Figure 1:
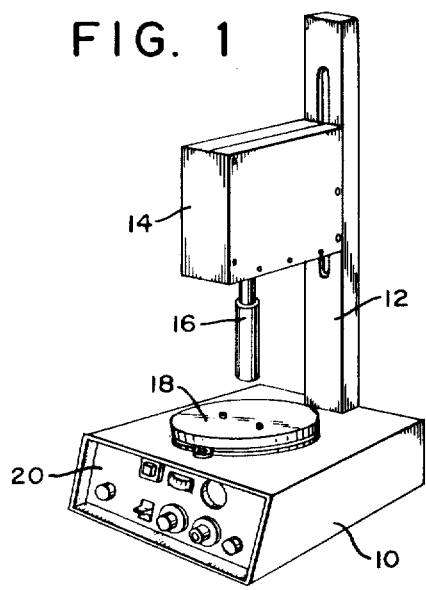
FIG. 1 is a perspective view of the improved apparatus according to the present invention.

Referring now to the FIGURES and FIG. 1 in particular, there is shown a typical apparatus useful for welding which comprises a base 10 from which extends a vertical column 12 supporting a housing 14 which encloses an electroacoustic transducer means and a motive means, not visible in FIG. 1. A horn 16 coupled to the electroacoustic transducer means extends through a suitable opening from the housing 14 and is adapted to engage with its frontal surface a workpiece disposed on the platform 18, forming a part of the base 10, for transferring vibratory energy to such workpiece to effect welding. The horn 16 is known also as tool, mechanical amplitude transformer, sonotrode, concentrator, resonator and the like, see for instance, "Ultrasonic Engineering" (book) by Julian R. Frederick, John Wiley & Sons, Inc., New York, N.Y. (1965) pages 87 to 103. The base 10 encloses, moreover, an electrical power supply (not shown) for converting electrical energy at power line frequency to high frequency energy in the sonic or ultrasonic frequency range, typically a predetermined frequency in the range between 1 kHz and 100 kHz. This electrical energy is applied to the electroacoustic transducer means which, in turn, converts the electrical energy to mechanical vibration and transmits the vibration to the horn 16.

The power panel 20 contains the necessary controls for operating the welding apparatus and to this end the controls on the panel 20 include an electrical power switch, timing cycle controls, pneumatic pressure control, indicating meters, etc. all as is well known to those skilled in the art.

Referring now to FIGS. 3 through 7, the detailed construction of the apparatus will be more clearly apparent. The electroacoustic transducer means comprises a plurality of juxtaposed disks 30 of piezoelectric material. The disks are placed between a backload 32 and a front driver 34 and retained by means of a central bolt 35 which places the piezoelectric disks under a compressive force. This arrangement comprises a so-called clamped transducer sandwich, see Frederick supra, pages 67 to 74. The same electroacoustic transducer construction is shown also in U.S. Pat. No. 3,524,085 issued to A. Shoh, entitled "Sonic Transducer" dated Aug. 11, 1970. The individual elements forming the transducer assembly are dimenished to cause the transducer construction to be resonant at a predetermined frequency and form at that frequency a half wavelength resonator for sound travelling longitudinally therethrough.

The transducer means is coupled to an intermediate coupling bar 36 by means of a threaded stud 40 and the horn 16 is coupled by means of stud 42 to the output end of the intermediate coupling bar 36. The coupling bar 36 (known also as "booster horn") and the horn 16 are dimensioned to cause the frontal surface 17 of the horn 16 to be disposed substantially at an antinodal region of longitudinal vibration when the piezoelectric disks 30 are energized with alternating current electrical energy of predetermined frequency via conductors 44. The vibratory energy occurring at the frontal surface 17 of the horn 16 is transferred to the workpiece W with which the frontal surface 17 is in forced contact.

A pair of leaf spring members 46 and 48, made from flat sheet metal stock, couple the electroacoustic transducer means to the stationary column 12. The leaf spring member 46 at its tapered front end is provided with a hole and is clamped between the radial surfaces of the backload 32 and the piezoelectric disk 30. The screw 35 holds this spring member end in place. The other end is clamped between a block 50 and a bar 52 using screws 54 which fit through respective holes in the spring member, see FIG. 4. The leaf spring member 48 is clamped similarly between the radial surfaces of the front driver 34 and the intermediate coupling member 36 and is also clamped at the other end to the block 50 by means of a bar 56 and screws 54, see FIG. 6.

The block 50 supporting also the housing 14 is adjustable in its elevation relative to the base 10 by means of a longitudinal slot 60 in the U-shaped column 12 and a pair of screws 58 which are adapted to clamp the block 50 against the column 12. In this manner the electroacoustic transducer assembly with horn 16 can be set at an adjustable height relative to the platform 18.

Reciprocating motion to the transducer means and horn 16 in a direction toward and away from the base 10 and platform 18 is provided by a pneumatically operated piston and cylinder assembly 62 which is operated through pneumatic controls to selectively apply pressure via flexible hoses 64 and 66 to either end of the cylinder. The front end of the piston rod is coupled to the front driver 34 of the electroacoustic transducer means by means of a link 68, using a pair of threaded nuts 70 on the piston rod and screw means 72 for fastening the link 68 against a flat spot at the peripheral surface of the front driver 34. The upper end of the cylinder of the pneumatic device 62 is coupled to a flat spring member 76 which with its other end is clamped to a block 78 fastened to the housing 14.

The platform 18 is movable relative to the base 10 in order to orient the workpiece relative to the horn 16 in the event that three-dimensionally contoured surfaces between the horn and workpiece must be in mating engagement. Specifically, the platform 18 is rotatable and for this purpose includes a centrally located pin 80 fitting through an opening in the channel 82 of the base. One or more flanged bushings 84 engage a peripheral groove 86 in the platform 18 and can be tightened against the groove by respective screws 88 which threadedly engage the channel 82. Upon loosening the screws 88 the platform 18 becomes rotatable and responsive to tightening of the screws 88 the platform is secured in its orientation.

The cylinder of the pneumatically operated motive means is fitted with a bracket 90 which supports a microswitch 92 having an actuating button 94. When the cylinder of the motive means 62 is suitably pressurized, the piston rod is driven downwardly to cause the horn to approach and establish contact with the workpiece W. As the engagement pressure increases, the leaf spring 76 permits the cylinder to undergo countermotion, that is, the cylinder moves upward as a natural reaction of the engagement pressure, causing the actuating button 94 to strike against the housing 14 for initiating actuation of the electrical circuit. In this manner, the electrical circuit energizes the electroacoustic transducer only when a sufficient engagement force between the frontal surface 17 and the workpiece W has been achieved. The described method of sensing the existence of an adequate engagement force before actuation of the electrical circuit has been shown and described in U.S. Pat. No. 3,493,457 issued to John Jugler, entitled "Control Circuit for Tool Driven by Sonic Energy," dated Feb. 3, 1970.

Figure 3:
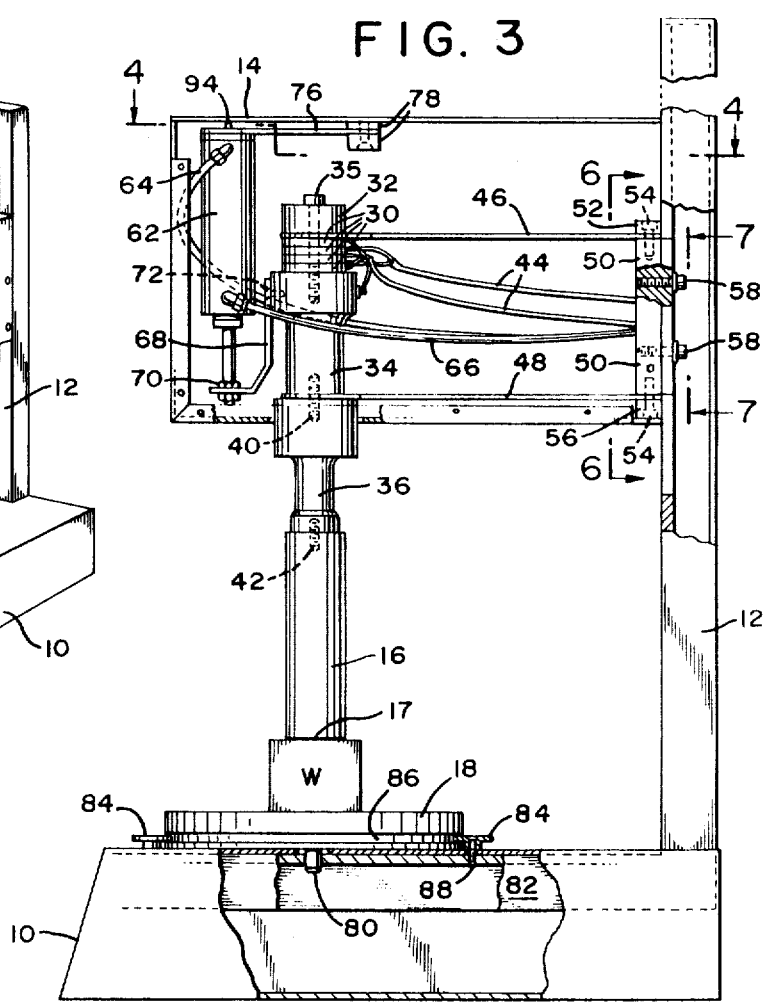
FIG. 3 is a side elevational view, partly in section, showing the transducer means in its lowered position and the horn in energy transferring contact with a workpiece.
Figure 4:
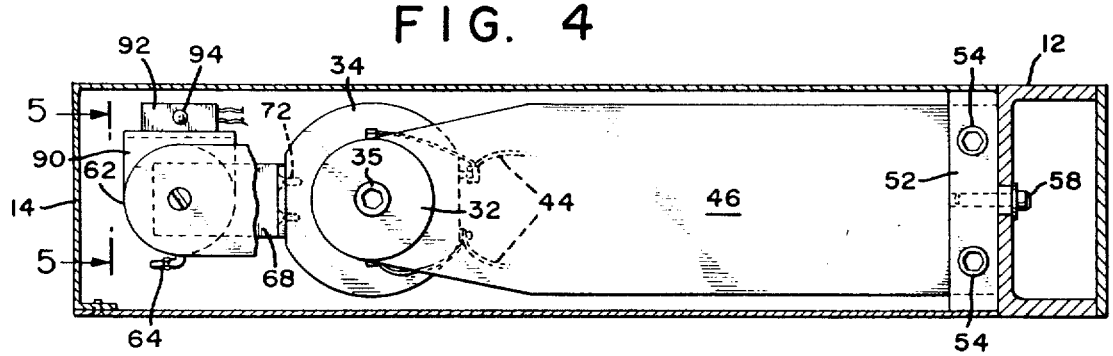
FIG. 4 is a sectional view along line 4—4 in FIG. 3.

It should be noted that the leaf spring members are adapted to yield and flex in the direction in which the reciprocating motion is required and that this reciprocating motion coincides substantially with the direction of propagation of the vibratory energy. Moreover, the leaf springs by virtue of their inherent characteristics exhibit extreme rigidity and strength to motion in the direction normal to the axis of the described vibratory motion at the end of the predetermined stroke. The leaf spring members 46 and 48 are clamped to the transducer means substantially at respective antinodal regions of longitudinal motion existing in the transducer means so as not to impede the high frequency, low amplitude vibration of the transducer means. The length of the leaf spring members is sufficient to provide for decoupling of the vibrations of the transducer means from the rigid support. In view of the fact that the spring members 46 and 48 in their non-deformed, unstressed configuration exhibit maximum rigidity along a direction normal to the axis of vibratory motion, the height of the transducer means relative to the platform is adjusted in such a manner that the leaf spring members 46 and 48 are in this non-deformed, non-stressed, flat condition when the frontal surface 17 of the horn 16 is in vibratory energy transferring contact with the workpiece as seen in FIG. 3, and that the springs 46 and 48 are in the stressed configuration when the transducer means is lifted from the workpiece. This latter condition is clearly illustrated in FIG. 2 where the transducer means is disposed in its retracted position. Moreover, it will be apparent that the spring are designed, taking into account the maximum permissible travel of the frontal surface of the horn, to cause the maximum deflection of the springs to be well within the elastic limit of the material.

It is realized that the frontal surface 17 along its reciprocating path from the lifted position to the work engaging position does not precisely undergo a straight lineal path, but executes a slightly curved path. For this reason, in addition to the reasons stated above, it is desirable that the frontal surface of the horn engage the workpiece when the leaf spring members are in their non-deformed, flat configuration at which instant the component of motion normal to the vibratory motion provided by the transducer means is at a minimum. This condition, being the end of the stroke, can be achieved very readily during the adjustment procedure preceding the welding operation.

One further most desirable feature will be apparent with reference to FIGS. 2 and 3. The piezoelectric disks 30 during operation dissipate a certain amount of heat caused by electrical and mechanical losses. The metal spring members 46 and 48 act as a heat sink, conducting heat away from the transducer construction.

Whereas the above description illustrates the use of piezoelectric disks for obtaining mechanical vibration in response to high frequency electrical energy, it will be apparent that spring members of the type shown may be used also in those instances in which electrical to mechanical energy conversion is achieved by magnetostrictive transducer means.

Figure 8:
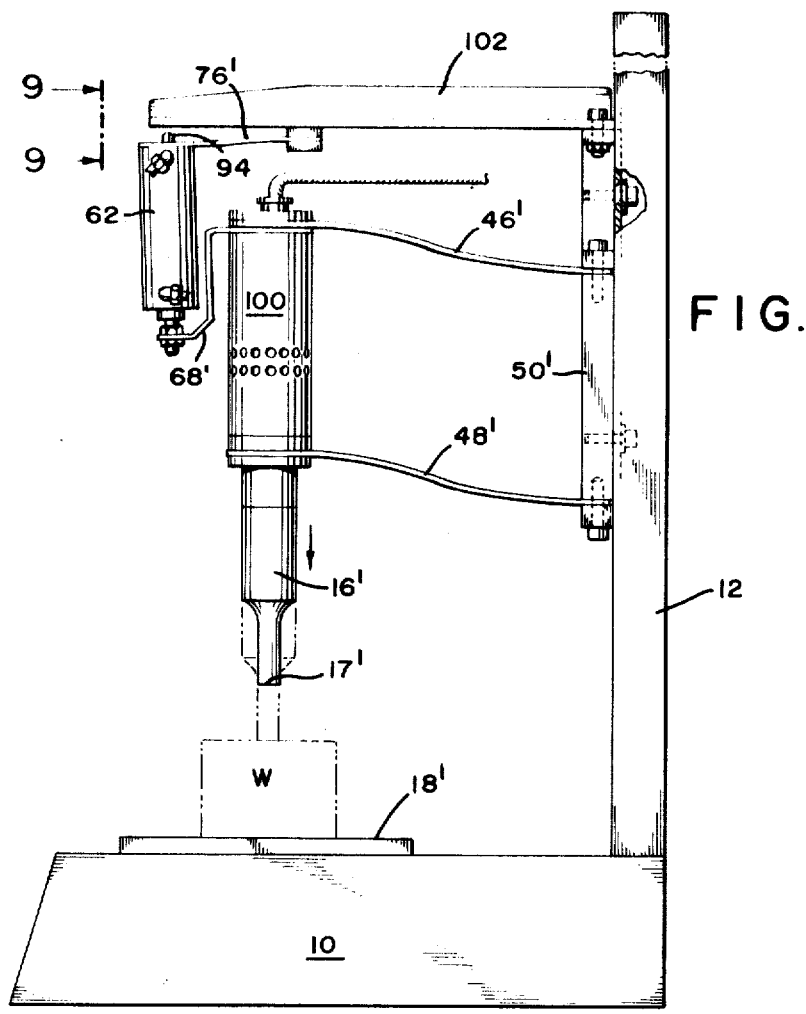
FIG. 8 is an elevational view of an alternative embodiment of an apparatus according to the present invention.
Figure 9:
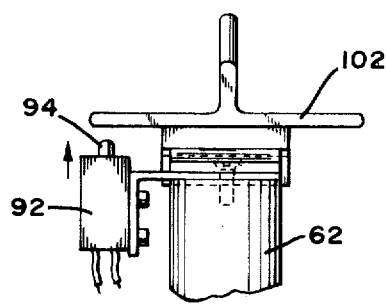
FIG. 9 is a view along line 9—9 in FIG. 8.

Referring now to FIGS. 8 and 9, there is shown a housing 100 which contains an electroacoustic transducer means of either the piezoelectric or magnetostrictive kind. A horn 16' having a frontal surface 17' adapted to transfer vibratory energy to a workpiece disposed on the platform 18' extends from the transducer housing. The housing 100 is coupled to a set of leaf spring members 46' and 48'. The electroacoustic transducer means contained in the housing is mechanically decoupled from the cylindrical housing 100 by suitable 0-ring means as is shown, for instance, in U.S. Pat. No. 3,328,610 issued to S. E. Jacke et al., entitled "Sonic Wave Generator," dated June 27, 1967. Therefore, the leaf spring members 46' and 48' are not required to be coupled to the housing 100 which encloses and supports the electroacoustic transducer means at antinodal regions of longitudinal motion, but may be coupled to the housing 100 at any suitable location, for instance, in proximity to the radial end surfaces. The pneumatically operated motive means 62 is mounted so that its piston rod is coupled by a link 68' to the housing 100 and the cylinder is supported by means of a leaf spring 76' from a beam 102 attached to the block 50'. A microswitch 92 is coupled to the cylinder and, as previously described, the countermotion resulting from the engagement force between the frontal surface of the horn and workpiece causes the actuating button 94 to strike against the underside of the beam 102 for causing actuation of the electrical circuit contained in the base 10 of the welding apparatus. Since the housing 100 is readily rotatable relative to a workpiece disposed on the platform 18' this mount is no longer orientation sensitive and the rotatable platform shown in FIGS. 1 to 7 can be replaced by a stationary platform 18'.

It will clearly be apparent that the above described construction is characterized by extreme simplicity, eliminating sliding or rolling motion for obtaining gross reciprocating motion between the electroacoustic transducer means and its horn and the stationary workpiece. All parts are readily accessible and can easily be inspected. There is a complete absence of mechanical wear. The leaf spring members are readily manufactured and calculated with only a rudimentary knowledge of mechanical engineering. The many elements required heretofore for achieving reciprocating motion have been eliminated and a rather revolutionary simplicity has been achieved by making use of bending motion. This invention, therefore, constitutes a major breakthrough and advance in the design and construction of sonic or ultrasonic welding apparatus.

I claim:

1. A sonic or ultrasonic apparatus comprising:
   a support for supporting electroacoustic transducer means;
   electroacoustic transducer means adapted to be resonant at a predetermined frequency of sound for providing vibratory energy in response to electrical energy of said frequency applied;
   leaf spring means coupling said transducer means to said support, said spring means being dimensioned to yield in the direction substantially parallel to the axis of propagation of the vibratory energy provided by said transducer means, but to exhibit rigidity in a direction substantially normal to said axis, and
   motive means coupled to said transducer means for imparting gross reciprocating motion to said transducer means relative to said support in a direction substantially parallel to said axis for coupling said transducer means into vibratory energy transmitting contact with a workpiece and for withdrawing said transducer means from such energy transmitting contact.

2. A sonic or ultrasonic apparatus comprising:
   a platform for supporting a workpiece;
   a column for supporting electroacoustic transducer means;
   electroacoustic transducer means adapted to be resonant at a predetermined frequency of sound travelling longitudinally therethrough for providing vibratory energy in response to electrical energy of said frequency applied;
   leaf spring means coupling said transducer means to said column, said spring means being dimensioned to yield in the direction substantially parallel to the axis of propagation of the vibratory energy provided by said transducer means, but to exhibit rigidity in a direction substantially normal to said axis, and
   motive means coupled to said transducer means for imparting gross reciprocating motion to said transducer means relative to said column in a direction substantially parallel to said axis for coupling said transducer means into vibratory energy transmitting contact with a workpiece on said platform and for withdrawing said transducer means from such energy transmitting contact.

3. A sonic or ultrasonic apparatus as set forth in claim 2, said motive means coupled to said transducer means being coupled also to said column.

4. A sonic or ultrasonic apparatus as set forth in claim 3, said leaf spring means and said electroacoustic transducer means being mounted to cause said leaf spring means to assume their substantially non-stressed shape when said motive means causes said transducer means to be in vibratory energy transmitting contact with a workpiece and to assume their stressed shape when said transducer means is withdrawn from said energy transmitting contact.

5. A sonic or ultrasonic apparatus as set forth in claim 3, and further leaf spring means coupling said motive means to said transducer means and said column.

6. A sonic or ultrasonic apparatus as set forth in claim 3, said motive means comprising fluid operated means.

7. A sonic or ultrasonic apparatus as set forth in claim 6, said motive means comprising a pneumatically operated device comprising a piston and cylinder.

8. A sonic or ultrasonic apparatus as set forth in claim 3, said leaf spring means coupling said transducer means to said column comprising a pair of sheet metal members.

9. A sonic or ultrasonic apparatus as set forth in claim 8, said pair of sheet metal members engaging said transducer means at axially spaced locations thereof.

10. A sonic or ultrasonic apparatus as set forth in claim 9, each of said sheet metal members being coupled to said transducer means substantially at a respective antinodal region of vibratory energy of said transducer means.

11. A sonic or ultrasonic apparatus as set forth in claim 3, and means coupled to said platform for causing said platform to be movable relative to said transducer means.

12. A sonic or ultrasonic apparatus as set forth in claim 11, said means coupled to said platform causing said platform to be rotatable.

13. A sonic or ultrasonic apparatus as set forth in claim 3, said column being supported by said platform and extending therefrom.

14. A sonic or ultrasonic apparatus as set forth in claim 13, and support means disposed for coupling said leaf spring means to said column at an adjustable distance from said platform.

15. A sonic or ultrasonic apparatus comprising:
a platform for supporting a workpiece;
a column;
an elongate coupling member adapted to be resonant along its axis at a predetermined frequency of vibration;
electroacoustic transducer means coupled to said coupling member for causing said member to be resonant in response to electrical energy of said frequency being applied to said transducer means;
leaf spring means coupling said member and transducer means to said column, said spring means being dimensioned to yield in the direction substantially parallel to the axis of propagation of said vibration in said member, but to exhibit rigidity in a direction substantially normal to said axis, and
motive means coupled to said member and transducer means and to said column for imparting gross reciprocating motion to said member and transducer means in a direction substantially parallel to said axis for coupling said member into vibratory energy transmitting contact with a workpiece on said platform and for withdrawing said member from such energy transmitting contact.

16. A sonic or ultrasonic apparatus as set forth in claim 15, said leaf spring means being coupled to said member at a pair of antinodal regions of vibration thereof.

17. A sonic or ultrasonic apparatus as set forth in claim 16, said leaf spring means comprising a pair of leaf springs, each spring being coupled with one of its ends to a respective antinodal region of vibration of said member.

18. A sonic or ultrasonic apparatus as set forth in claim 15 and means coupling said transducer means to a supply of high frequency electrical energy.

19. A sonic or ultrasonic apparatus comprising:
a support;
electroacoustic transducer means adapted to be resonant at a predetermined frequency of sound for providing vibratory energy in response to electrical energy of said frequency applied;
means coupling said transducer means to said support, said means coupling being dimensioned to yield in the direction substantially parallel to the axis of propagation of the vibratory energy provided by said transducer means, but to exhibit rigidity in a direction substantially normal to said axis, and
motive means coupled to said transducer means for imparting gross reciprocating motion to said transducer means relative to said support in a direction substantially parallel to said axis for coupling said transducer means into vibratory energy transmitting contact with a workpiece and for withdrawing said transducer means from such energy transmitting contact, said reciprocating motion causing said means coupling to be subjected to a bending motion.

20. A sonic or ultrasonic apparatus as set forth in claim 19, said bending motion being within the limit of elasticity of the material of said means coupling said transducer means to said support.

21. A sonic or ultrasonic apparatus comprising:
a platform;
a column extending from said platform;
an electroacoustic transducer assembly including piezoelectric disk means, a coupling means for transmitting vibratory energy provided by said disk means to a workpiece, and means coupling said disk means to said coupling means and causing said disk means to be under a static compressive force, said electroacoustic transducer assembly being dimensioned to be resonant along its longitudinal axis when said piezoelectric means is energized with alternating current electrical energy of predetermined frequency;
a pair of leaf spring members coupling said transducer assembly to said column, each member being secured with one end to said transducer assembly at a respective antinodal region of longitudinal motion thereof and coupled with its respective other end to said column, said members being dimensioned to yield in the direction substantially parallel to the axis of propagation of the vibratory energy in said transducer assembly, but to exhibit rigidity in a direction substantially normal to said axis, and motive means coupled for imparting gross reciprocating motion to said transducer assembly relative to said platform in a direction substantially parallel to said axis of propagation of said energy whereby to cause bending of said spring members to accommodate such motion.

22. A sonic or ultrasonic apparatus as set forth in claim 21, said piezoelectric disk means comprising a plurality of juxtaposed disks, and at least one of said leaf spring members being in heat conductive contact with said disks for removing heat from said assembly.

23. A sonic or ultrasonic apparatus as set forth in claim 22, and bolt means for clamping said one leaf spring means into heat conductive contact with at least one of said disks.

* * * * *